United States Patent [19]

Doi et al.

[11] Patent Number: 4,504,631

[45] Date of Patent: Mar. 12, 1985

[54] PHOTORESIST MATERIAL

[75] Inventors: Hideaki Doi; Kenichi Kokubun; Teruo Sakagami; Naohiro Murayama, all of Fukushima, Japan

[73] Assignee: Kureha Kagaku Kogyo Kabushiki Kaisha, Tokyo, Japan

[21] Appl. No.: 499,486

[22] Filed: May 31, 1983

[51] Int. Cl.³ .............................................. C08F 8/24
[52] U.S. Cl. ............................. 525/327.3; 525/329.2; 525/330.3; 525/331.4; 525/333.4; 525/359.3; 526/284
[58] Field of Search ............... 525/333.4, 327.3, 330.3, 525/329.2, 331.4; 526/284

[56] References Cited

U.S. PATENT DOCUMENTS

| | | | |
|---|---|---|---|
| 2,694,702 | 11/1954 | Jones | 525/333.4 |
| 3,009,906 | 11/1961 | Eichhorn et al. | 525/333.4 |
| 3,164,575 | 1/1965 | Welch et al. | 526/284 |
| 3,297,648 | 1/1967 | Corte et al. | 525/333.4 |
| 3,311,602 | 3/1967 | Raley, Jr. | 525/333.4 |
| 3,607,989 | 9/1971 | Sonnabend | 525/333.4 |

FOREIGN PATENT DOCUMENTS

| | | |
|---|---|---|
| 149671 | 7/1981 | Fed. Rep. of Germany . |
| 867769 | 5/1961 | United Kingdom . |

Primary Examiner—Joseph L. Schofer
Assistant Examiner—Bernard Lipman
Attorney, Agent, or Firm—Hill, Van Santen, Steadman & Simpson

[57] ABSTRACT

The photoresist material comprises a polymer having chloromethyl groups introduced therein and containing 2-isopropenylnaphthalene as one component, an average substitution degree of the chloromethyl groups based on the polymer is within a range of 0.2 to 5.

The photoresist material has a high glass transition point, a high sensitivity to radiation and an excellent dry etching resistance, whereby it is suitably used for the manufacture of a semiconductor element using radiation and provides a good resolution on etching.

14 Claims, 7 Drawing Figures

PHOTORESIST MATERIAL

BACKGROUND OF THIS INVENTION

1. Field of the Invention

The present invention relates to a photoresist material which is suitably used for the manufacure of a semiconductor element and, more particularly, to a photoresist material which has a high glass transition point, a high sensitivity to radiation, and an excellent dry etching resistance.

Various industrial techniques have been conventionally proposed which utilize photosensitive compositions. For example, in the lithography process in photomechanical processes for the manufacture of semiconductor elements, photosensitive compositions for various purposes have been proposed and have been actually used. Most of such compositions are called photoresists; parts of such photoresists which are irradiated with light, ultraviolet rays or the like respond thereto such that the irradiated parts of the photoresists have a different solubility from that of the non-irradiated parts thereof, thereby forming a pattern.

In the field of manufacuture of semiconductor elements, highly integrated elements such as a VLSI, a magnetic bubble element or the like can now be manufactured with recent fast technical developements. However, with the conventional photolithography utilizing light or ultraviolet rays having a wavelength of about 400 nm, the resolution obtainable is limited. For this reason, lithography utilizing radiation with a shorter wavelength such as far ultraviolet rays, X-rays, an ion beam or an electron beam are beginning to be used.

A resist material to be used in lithography utilizing far ultraviolet rays, X-rays, an electron beam or the like must have high sensitivity to such radiation and must also having a high dry etching resistance in order to provide a high resolution. A composition having aromatic rings is generally known to have a high dry etching resistance. As resist materials having aromatic rings have been proposed, for example, polystyrene, poly-α-methylstyrene, halogenated polystyrene, chloromethylated polystyrene and the like, which exhibit excellent dry etching resistance.

However, these resist materials have a low glass transition point Tg; 105° C. for polystyrene and so on. For this reason, special care must be taken for temperature rise during dry etching. Although the speed of dry etching is generally increased with an increase in the substrate temperature and an increase in the etching power, a high etching power results in a high surface temperature of the substrate. If the temperature of a resist layer formed on the surface of the substrate exceeds its Tg, the dry etching resistance is known to abruptly decrease. Accordingly, etching must be performed while cooling the substrate. In this manner, if the dry etching speed is increased, a temperature rise in the resist layer cannot be avoided. In view of this problem, the temperature rise of the substrate must be properly controlled, even if at the cost of throughput. Resist materials having a higher Tg have thus been desired. After printing a pattern on a resist, it is generally postbaked. The baking temperature is set in accordance with each application. For example, if the adhesion strength between the substrate and the resist must be improved, the baking temperature is desirably high within a range such that the pattern may not thermally deform. With a resist material having a low Tg, the baking temperature must also be lowered accordingly. Thus, in order to improve the adhesion strength between a substrate and a resist, a resist material having a high Tg, that is, a resist material having a high resistance to heat and a high sensitivity, is desired.

Among the resist materials having aromatic rings mentioned above, the poly-α-methylstyrene has a glass transition point of 192° C. which is relatively high. On the other hand, the sensitivity is low, and a considerably high sensitivity may not be obtained even if chloromethyl groups which are highly sensitive groups are introduced.

OBJECTS AND SUMMARY OF THE INVENTION

It is an object of the present invention to provide a photoresist material which has a high sensitivity to radiation.

Another object of the present invention is to provide a photoresist material which has a high heat resistance.

A further object of the present invention is to provide a photoresist material which has a high glass transition point.

A still further object of the present invention is to provide a photoresist material which has a high dry etching resistance.

In accordance with the present invention, there is provided a photoresist material comprising a polymer having chloromethyl groups introduced thereinand containing 2-isopropenylnaphthalene as one component, the average substitution degree of said chloromethyl groups based on said polymer being within a range of 0.2 to 5.

DESCRIPTION OF THE PREFERRED EMBODIMENTS

A polymer in which chloromethyl groups are introduced is used for the photoresist material in accordance with the present invention. The polymer includes a homopolymer of 2-isopropenylnaphthalene, i.e. poly-2-isopropenylnaphthalene, and a copolymer containing 2-isopropenylnaphthalene as one component (hereinafter to be referred to as "2-isopropenylnaphthalene copolymer").

Poly-2-isopropenylnaphthalene to be used in the present invention may be easily obtained by anionic living polymerization of 2-isopropenylnaphthalene, and its polymerization degree and molecular weight dispersibility may be freely controlled. Furthermore, since a high polymer having a mono-disperse molecular weight distribution is obtained, this being a characteristic feature of anionic living polymerization, poly-2-isopropenylnaphthalene is extremely advantageous for use as a photoresist material.

The 2-isopropenylnaphthalene copolymer of this invention can be easily manufactured by radical polymerisation. In the copolymer, as a component to be copolymerized with the 2-isopropenylnaphthalene may be used any substance which is copolymerizable therewith. Examples of such materials may include a styrene-type monomer such as styrene, α-methylstyrene, or chloromethylated styrene; an acrylic-type monomer such as methyl methacrylate or glycidyl methacrylate; or unsaturated nitrile such as unsaturated acrylonitrile. They may be used in combination to provide a multipolymer.

In the composition ratio of the copolymer as a photoresist material of the present invention the ratio of the 2-isopropenylnaphthalene is preferably 10 mole % or more and is more preferably within a range of 10 to 90 mole %. This is based on the following reason. When the amount of the 2-isopropenylnaphthalene is less than 10 mole %, a copolymer having a high glass transition point is hard to prepare. On the other hand, if the amount of the 2-isopropenylnaphthalene is more than 90 mole %, radical polymerization of 2-isopropenylnaphthalene with the other component also becomes difficult.

Although the method for introducing the chloromethyl groups into poly-2-isopropenylnaphthalene is not particularly limited, a method using chloromethyl methyl ether is preferably adopted since it results in a small side-reaction. The chloromethyl group may be substituted in any position of the naphthalene ring, and the resultant chloromethylated poly-2-isopropenylnaphthalene may contain monomer units having naphthalene rings into which no chloromethyl group is introduced. In order to achieve a high sensitivity, the average substitution degree or molar number of chloromethyl groups introduced per one mole of poly-2-isopropenylnapharene must be 0.2 or more. However, when the average substitution degree exceeds 5, cross-linking tends to be caused during chloromethylation, and the resultant resist may not be used. Accordingly, the average substitution degree of the chloromethyl groups based on the polymer must be 0.2 to 5. Substitution of the chloromethyl groups may be confirmed by infrared ray analysis, and the average substitution degree may be obtained from an increase in the weight of the poly-2-isopropenylnaphthalene before and after chloromethylation.

The introduction of chloromethyl groups into the 2-isopropenylnaphthalene copolymer may be performed by chloromethylating the copolymer or by copolymerizing components at least part of which have chloromethyl groups. In the latter case, the components having chloromethyl groups may be one or both of 2-isopropenylnaphthalene and the other component or components, and the copolymer obtained by copolymerization may or may not be further chloromethylated. When chloromethyl groups are introduced after preparing a 2-isopropenylnaphthalene copolymer, the method involving the high polymer reaction using chloromethyl methyl ether is preferably used due to a small side-reaction. If chloromethyl groups are introduced after preparing a copolymer in this manner, and if the other copolymerizing component is an aromatic monomer such as styrene, chloromethyl groups are simultaneously introduced into these components. If the other component is methyl methacrylate or the like, chloromethyl groups are not introduced in such component. In either case, the object of the present invention may be achieved provided the average substitution degree of the chloromethyl groups with respect to the copolymer is within a range of 0.2 to 5. In the copolymer, chloromethyl groups may be introduced at any positions. For example, in the case of 2-isopropenylnaphthalene, hydrogen atoms of the naphthalene rings are substituted by chloromethyl groups by introduction thereof. The chloromethyl groups may be introduced at any positions of the naphthalene rings and the copolymer may contain some naphthalene rings into which the chloromethyl groups are not introduced. Note that in order to realize a high sensitivity of the resultant resist, the average value of the substitution degree of the chloromethyl groups must be 0.2 to 5. When the average substitution degree exceeds 5, the storage stability of the obtained resist is degraded. On the other hand, when the average substitution degree is less than 0.2, a high sensitivity may not be obtained. When a copolymer is obtained by copolymerizing monomers containing chloromethyl groups, the average substitution degree of the chloromethyl groups may be calculated from the copolymer composition. When chloromethyl groups are introduced into the copolymer by the high polymer reaction, the average substitution degree may be confirmed by elemental analysis, infrared ray analysis, or measuring the weight before and after the chloromethylation reaction. In the case of a bipolymer having a formula below:

(wherein M is the other component monomer, n and m are respectively the composition molar ratios (n+m=1), a is the mole number of chloromethyl groups introduced per one mole of 2-isopropenylnaphthalene, and b is the mole number of chloromethyl groups introduced per one mole of the other component monomer, a and b being integers more than 0), the average substitution degree x of chloromethyl groups in the copolymer according to the present invention is given by:

$$x=(na+mb)/(n+m)$$

If the polymerization degree of each of the poly-2-isopropenylnaphthalene and the 2-isopropenylnaphtharene copolymer to be chloromethylated is too low, the film forming ability of the photoresist material is lowered. Thus, the polymerization degree of each polymer is preferably 40 or higher. The polymerization degree is not particularly limited provided it is higher than this lower limit. However, if the polymerization degree becomes too high, the viscosity of a coating solution for spin coating becomes too high, so that a thin resist layer may not be formed. Accordingly, the polymerization degree of each polymer to be used in the present invenion is more preferably 40 to 15,000. The polymerization degree is obtained by measuring the limiting viscosity number at 25° C. of a solution of the polymer in tetrahydrofuran and calculating the molecular weight according to the equation of $[\eta]=1.434\times 10^{-2}\times M^{0.663}$ (where M is the molecular weight; Makromol. Chem. 182, 3279, ('81)).

The Tg of poly-2-isopropenylnaphthalene is as high as about 230° to 240° C. Furthermore, since poly-2-isopropenylnaphthalene has naphthalene rings which are aromatic rings, it may be used as a photoresist material having a high dry etching resistance. However, poly-2-isopropenylnaphthalene has an extremely low radiation resistance and cannot be used in practice without certain measures being taken. However, a photoresist material of the present invention obtained by introduction of chloromethyl groups has a high sensitivity to radiation such as far ultraviolet rays, X-rays, or an electron beam. For example, the composition of the present invention has a sensitivity of about $10^{-4}$ Joule/cm$^2$ (to be referred to as J/cm$^2$ for brevity hereinafter) to far ultraviolet rays having a wavelength of, for example, 254 nm. The composition of the present invention has extremely good sensitivity characteristics such that the slope (contrast) of the sensitivity curve as a measure of resolution is 1 or more. Note that the slope of the sensitivity curve is defined by a tangent to a point corresponding to the normalized remaining film thickness of 0.5 on the sensitivity curve where the normalized remaining film thickness (the ratio of the thickness of the film remaining after radiation and developing to the thickness prior to radiation as defined as 1.0) is plotted along the axis of ordinate and the radiation dose is plotted along the axis of abscissa.

In general, the glass transition point Tg of a copolymer is known to be an intermediate temperature between the glass transition points of the respective homopolymers as the components thereof. It is known that the relationship between a glass transition point and a copolymer composition may be approximated by one of the following two equations in the case of, for example, a bipolymer:

$$Tg = v_1 Tg_1 + v_2 Tg_2 \quad (1)$$

$$1/Tg = w_1/Tg_1 + w_2/Tg_2 \quad (2)$$

(where $Tg_1$ and $Tg_2$ are respectively the glass transition points of components 1 and 2, $v_1$ and $v_2$ are respectively volume fractions of the components 1 and 2 of the copolymer, and $w_1$ and $w_2$ are respectively weight fractions thereof, the temperature being expressed in the absolute temperature.)

If the 2-isopropenylnaphthalene used in the present invention is the component 1 in the above equations, the glass transition point $Tg_1$ of its homopolymer, i.e., the poly-2-isopropenylnaphthalene is as high as 230° C. Therefore, when a material comprising the copolymer containing this 2-isopropenylnaphthalene is used, the glass transition point of the resist may be controlled to be high. When the component 2 is, for example, styrene, its $Tg_2$ is 105° C. Thus, the range of Tg is 105° to 230° C. according to the composition ratio of the copolymer. In practice, the Tg of a copolymer consisting of 21% moles and 34% moles of 2-isopropenylnaphthalene with respect to the styrene are 121° C. and 132° C., respectively, which are higher than that obtainable with a homopolymer of styrene. When 2-isopropenylnaphthalene in which the chloromethyl groups are substituted (to be referred to as "chloromethylated 2-isopropenylnaphthalene" hereinafter) is used as the component 1 in place of 2-isopropenylnaphthalene, a similar effect may be obtained since the glass transition point of the homopolymer of the chloromethylated 2-isopropenylnaphthalene is substanitally equal to that of the 2-isopropenylnaphthalene.

In order to use the thus obtained polymer as a photoresist material in the manufacture of semiconductor elements, a photoresist material may be applied on a substrate by the conventional spin coating. Accordingly, although a solvent or a developer to be used for dissolving the resist material is not particularly limited, a chlorine-type solvent or an aromatic solvent such as benzene, toluene, xylene, monochlorobenzene or chloroform is preferable due to the resultant high solubility. For example, a uniform resist layer may be formed on a substrate by dissolving this resist material in monochlorobenzene after adjustment to its proper concentration and spin coating the resultant solution. After the solvent has dried away, the resist layer is irradiated with far ultraviolet rays, X-rays, an electron beam or the like to print a pattern, which is post-baked and developed to provide an excellent negative pattern.

The radiation to be used in the present invention may include light and a high energy beam such as ultraviolet rays, far ultraviolet rays, X-rays, an electron beam, an ion beam, $\gamma$-rays, $\alpha$-rays and a neutron beam.

The photoresist material of the present invention is of negative type. Since the chloromethylated 2-isopropenylnaphthalene has a relatively high sensitivity, a copolymer containing methyl methacrylate as the other component also becomes negative type.

Although the photosensitive material provided by the present invention is particularly useful as a photoresist material, the range of its application is not limited to a photoresist material. For example, the composition may be used as a recording medium utilizing its physical or chemical reaction upon irradiation.

An example of such an application will now be described wherein the photosensitive composition of the present invention is applied to a material for an optical disc recording medium. A non-recorded optical disc is prepared by coating the photo sensitive composition of the present invention on a disc-shaped substrate comprising polymethyl methyl methacrylate, glass, a metal or the like. The information to be recorded is converted into digital signals, and an ultraviolet beam focused to have a small spot diameter is used to concentrically scan the photosensitive composition on the non-recorded optical disc in accordance with the obtained digital signals, thereby recording the information. The part of the composition which is irradiated with the ultraviolet rays becomes chemically inert since the photosensitive groups within the composition have reacted upon irradiation with the ultraviolet rays. On the other hand, the part of the composition which is not irradiated with the ultraviolet rays remains chemically active since the photosensitive groups have not yet reacted. If the optical disc with the signals recorded thereon is dyed with a dye which has an ability to chemically couple with the photosensitive groups which are still chemically active, the part of the disc which is not irradiated with an ultraviolet beam becomes dyed while the part which is irradiated with the beam is not dyed. Accordingly, the amount of light transmittance or a change in the amount of light reflected may be detected, thereby allowing reading of the digitally recorded contents.

The present ivnention will now be described by way of its examples.

EXAMPLE 1 AND COMPARATIVE EXAMPLE

Highly purified 2-isopropenylnaphthalene in the amount of 12.5 g was subjected to anionic living polymerization at −50° C. and in a highly purified nitrogen atmosphere, using tetrahydrofuran as a polymerization catalyst and 0.75 ml of a hexane solution containing 15% by weight of n-butyl lithium as an initiator. After the polymerization reaction is terminated, the reaction product was precipitated in methanol, filtered and vacuum-dried to provide 12.0 g of poly-2-isopropenylnaphthalene. The glass transition point of the resultant polymer was measured by a differential scanning-type calorimeter to be 230° C. and the polymerization degree thereof was 2,300. The poly-2-isopropenylnaphthalene in the amount of 0.1 g was dissolved in 15 ml of chloromethyl methyl ether, and the resultant solution was cooled to −20° C. Five mililiters of a chloromethyl methyl ether solution containing 20% by volume of tin tetrachloride were added to the resultant solution under agitation, and was agitated at high speed at −20° C. to be reacted for 3 hours. Thereafter, in order to terminate the reaction, a mixture of dioxane and water in the mixing ratio of 1/1 was added in the amount of 20 ml, and agitation was continued for 30 minutes. The resultant product was precipitated in methanol, filtered and vacuum-dried to provide 0.153 g of chloromethylated poly-2-isopropenylnaphthalene. The infrared ray absorption of this reaction product exhibited absorption of 1,260 cm$^{-1}$, which indicates introduction of the chloromethyl groups. Considering the change in the weight of poly-2-isopropenylnaphthalene before and after the reaction, it is calculated that an average amount of 1.8 moles of the chloromethyl groups has been introduced per one mole of the constituent monomer thereof. The glass transition point of the chloromethylated poly-2-isopropenylnaphthalene was measured by a differential scanning-type calorimeter to be 232° C.

The thus obtained chloromethylated poly-2-isopropenylnaphthalene was dissolved in monochlorobenzene in an amount of 0.02 g/ml to provide a coating solution. Using a spinner, the coating solution was applied on a silicon wafer or a quartz substrate to form thereon a resist layer of about 0.1 μm thickness. The substrate with such a resist layer formed thereon was irradiated with far wavelength of 254 nm and was developed by monochlorobenzene. The thickness of the remaining film was measured by a multi reflection interference microscope.

Figure 1:
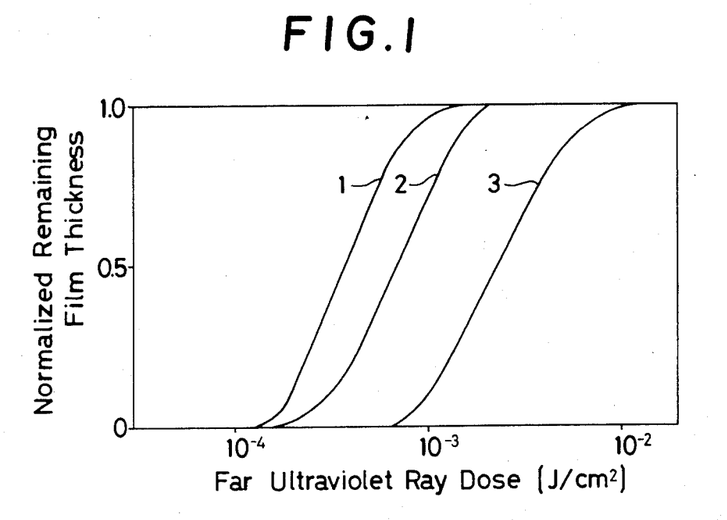
FIGS. 1 to 7 are graphs illustrating variations in normalized remaining thicknesses of resists of Examples 1 to 8 and Comparative Example 1 with varying doses of radiation, respectively.

Curve 1 shown in FIG. 1 is a characteristic curve obtained in this exmaple. The dose corresponding to a 50% normalized remaining film thickness was $3.7 \times 10^{-4}$ J/cm$^2$ and the sensitivity curve had a slope of 1.4. As a Comparative Example, curve 3 is shown which is a sensitivity curve of a chloromethylated polystyrene (containing 1.3 moles of chloromethyl groups per one mole of the polystyrene constituent monomer) which was obtained by chloromethylating a polystyrene having a molecular weight of 500,000 by a similar method to that in Example 1 described above. In this Comparative Example, the dose corresponding to a 50% normalized film thickness was $2.3 \times 10^{-3}$ J/cm$^2$, and the curve had a slope of 1.2.

A resist layer comprising a chloromethylated poly-2-isopropenylnaphthalene having a thickness of 0.1 μm coated on the silicon wafer as described above was irradiated through a chromium mask with far ultraviolet rays having a wavelength of 254 nm so as to print a test pattern. The test pattern was then developed by monochlorobenzene. A negative pattern having a line width of 0.5 μm was obtained, which had an excellent resolution.

EXAMPLE 2

The chloromethylation reaction of 0.1 g of the same poly-2-isopropenylnaphthalene to that used in Example 1 above was performed by a similar method to that in Example 1 at −20° C. for 30 minutes, thereby providing 0.126 g of chloromethylated poly-2-isopropenylnaphthalene. The infrared ray absorption of the reaction product exhibited absorption at 1,260 cm$^{-1}$, which confirmed introduction of the chloromethylated groups. From the change in the weight before and after the reaction, it is seen that an average amount of 0.9 moles of chloromethyl groups has been introduced per mole of the poly-2-isopropenylnaphthalene. The glass transition point of the chloromethylated poly-2-isopropenylnaphthalene was measured to be 230° C.

The sensitivity curve of the thus obtained chloromethylated poly-2-isopropenylnaphthalene was obtained by a similar method to that used in Example 1. Curve 2 in FIG. 1 is a sensitivity curve of this exmaple. The dose corresponding to a 50% normalized remaining film thickness was $7.0 \times 10^{-4}$ J/cm$^2$, and the curve had a slope of 1.3. In a similar manner to that in Example 1, a resist layer obtained from this polymer was printed in a test pattern and was developed by monochlorobenzene. A negative pattern having a line width of 0.5 μm was obtained.

EXAMPLE 3

Figure 2:
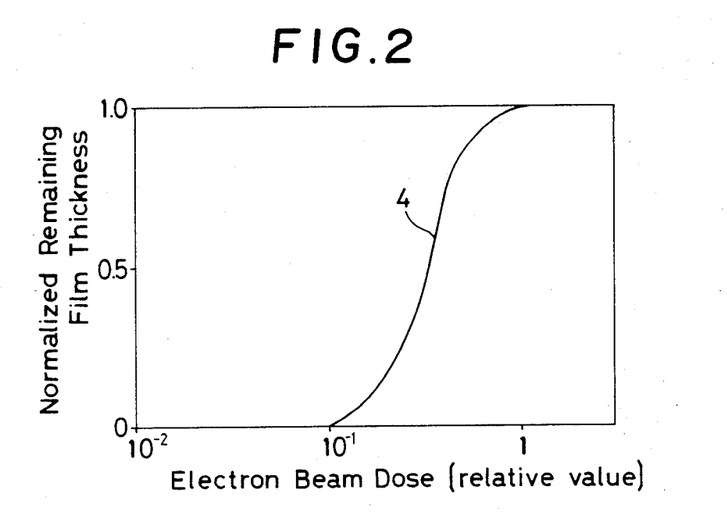

The chloromethylated poly-2-isopropenylnaphthalene obtained in Example 1 was coated to a thickness of 0.1 μm on a silicon wafer. The resist layer was irradiated with an electron beam, and was then developed in monochlorobenzene to obtain a sensitivity curve using an electron microscope. Curve 4 in FIG. 2 is a sensitivity curve obtained in this example. Since the absolute value of the electron beam dose was not obtained, it was plotted as a relative value along the axis of abscissa. The sensitivity curve had a slope of 2.4.

EXAMPLE 4

Figure 3:
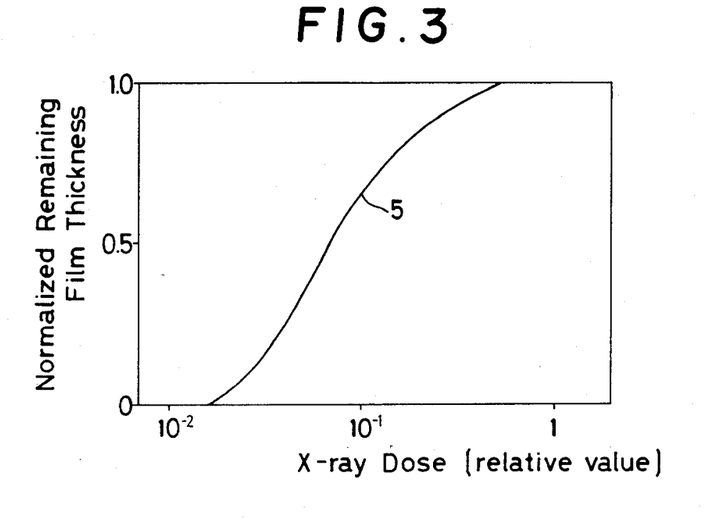

The chloromethylated poly-2-isopropenylnaphthalene obtained in Example 1 was coated on a silicon wafer in a similar manner to that in Example 1. Using an X-ray diffractiometry apparatus, the resist layer was irradiated with X-rays having a wavelength of 0.154 nm, and was developed in monochlorobenzene to obtain a sensitivity curve. Curve 5 in FIG. 3 is a sensitivity curve obtained in this example. Since the absolute value of the dose of X-rays was not obtained, the relative value was plotted along the axis of abscissa. The sensitivity curve had a slope of 1.1.

EXAMPLE 5

2-isopropenylnaphthalene copolymers a, b and c having the compositions shown in Table 1 below were prepared by emulsification polymerization.

To 30 g of water were added 10 g of a mixture of 2-isopropenylnaphthalene and the other component monomer, an initiator consisting of 0.04 g of potassium persulfate and 0.01 g of sodium bisulfite, and 0.3 g of dodecylbenzene sodium sulfonate as an emulsifier. After nitrogen substitution, the mixture was agitated at 60° C. for 16 hours to cause polymerization. The reaction product was precipitated in methanol, filtered, dissolved in chloroform, precipitated in methanol and filtered. The polymerization yield was 85%. The intrinsic viscosities and the glass transition points Tg of these copolymers are shown in Table 1 below:

TABLE 1

| Copolymer | Composition ratio (% moles) | | Intrinsic viscosity (ml/g) | Tg (°C.) |
|---|---|---|---|---|
| | 2-isopropenyl-naphthalene | Other component | | |
| a | 34 | Styrene 66 | 50.4 | 132 |
| b | 21 | Styrene 79 | 81.6 | 121 |
| c | 20 | Methyl methacrylate 80 | 23.9 | 143 |

In table 1 above, the intrinsic viscosity is a measurement when the copolymer concentration is 0.01 ml/g at 30° C., the solution being a benzene solution in the cases of the copolymers a and b and the solution being a methyl ethyl ketone solution in the case of the copolymer c. The Tg was measured by a differential scanning-type calorimeter.

Chloromethylated copolymers A, B and C having a high sensitivity were prepared by introducing chloromethyl groups in these copolymers a, b and c.

More specifically, the copolymers a, b and c were dissolved in the amounts of 0.1 g in 15 ml of chloromethyl methyl ether, respectively, and the resultant solutions were cooled to $-20°$ C. Five milliliters of a chloromethyl methyl ether solution containing 20% by volume of tin tetrachloride was added under agitation thereto, and the mixure was agitated at high speed at $-20°$ C. for 3 hours. In order to terminate the reaction, 20 ml of the mixture of oxane and water in the mixing ratio of 1 to 1 were added thereto, and the resultant mixture was agitated for 30 minutes. Subsequently, the reaction product was precipitated in methanol, filtered and vacuum-dried to provide a chloromethylated copolymer. The infrared ray spectrum of the reaction product indicated absorption at 1,260 $cm^{-1}$, which confirmed introduction of chloromethyl groups. The average substitution degrees of these chloromethylated copolymers A, B and C are shown in Table 2 below:

TABLE 2

| Chloromethylated copolymer | Raw material copolymer | Average substitution degree of chloromethyl groups |
|---|---|---|
| A | a | 0.75 |
| B | b | 0.65 |
| C | c | 0.23 |

Referring to Table 2 above, the average substitution degree of the chloromethyl groups was calculated from the change in the weight before and after the reaction, and was obtained based on one mole of the total constituent units including the other component. For example, in the case of a copolymer consisting of 50% moles of 2-isopropenylnaphthalene and 50% moles of methyl methacrylate, if an average amount of 1.5% moles of chloromethyl groups is introduced per one mole of 2-isopropenylnaphthalene, the average substitution degree of the chloromethyl groups in this copolymer is calculated to be 0.75.

Figure 4:
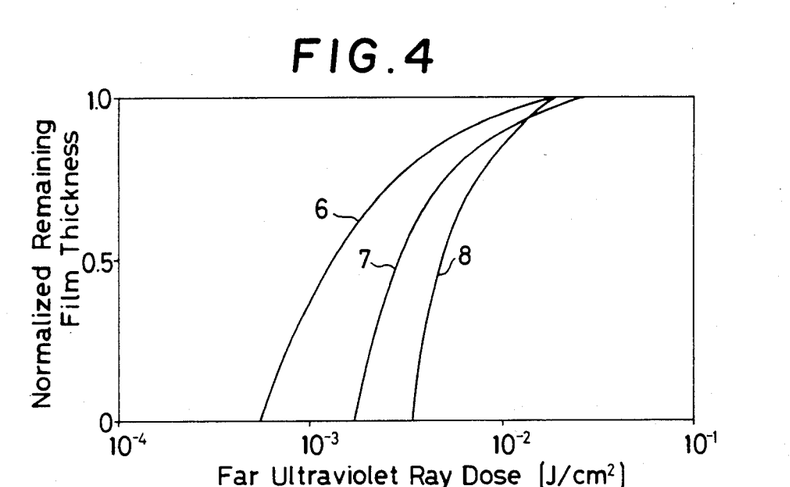

The thus obtained chloromethylated copolymer was dissolved in monochlorobenzene to provide a 0.02 g/ml coating solution. Subsequently, the coating solution was applied on a silicon wafer or a quartz substrate using a spinner to form a resist layer of about 0.1 $\mu$m thickness. The resist layer was then irradiated with far ultraviolet rays having a wavelength of 254 nm, and was developed by monochlorobenzene. The remaining film thickness was measured by a multi interference microscope. Curves 6, 7 and 8 in FIG. 4 are sensitivity curves of the chloromethylated copolymers A, B and C in this example. The normalized remaining film thickness on the curve indicates the relative value of the remaining film thickness with the thickness of the resist layer before irradiation being 1. The dose of far ultraviolet rays for providing a 0.5 normalized remaining film thickness was defined as a sensitivity of the copolymer, and the slope of a tangent at this point was defined as the contrast. The obtained results are shown in Table 3 below:

TABLE 3

| Chloromethylated copolymer | Sensitivity (J/cm$^2$) | Contrast |
|---|---|---|
| A | $1.3 \times 10^{-3}$ | 1.0 |
| B | $3.0 \times 10^{-3}$ | 1.4 |
| C | $4.8 \times 10^{-3}$ | 1.8 |

The resist layers formed by applying the respective chloromethylated copolymers on silicon wafers were irradiated through a chromium mask with far ultraviolet rays having a wavelength of 254 nm to print test patterns. The test patterns were developed by monochlorobenzene. The negative patterns having a line width of 0.5 $\mu$m and an excellent resolution were obtained.

EXAMPLE 6

Figure 5:
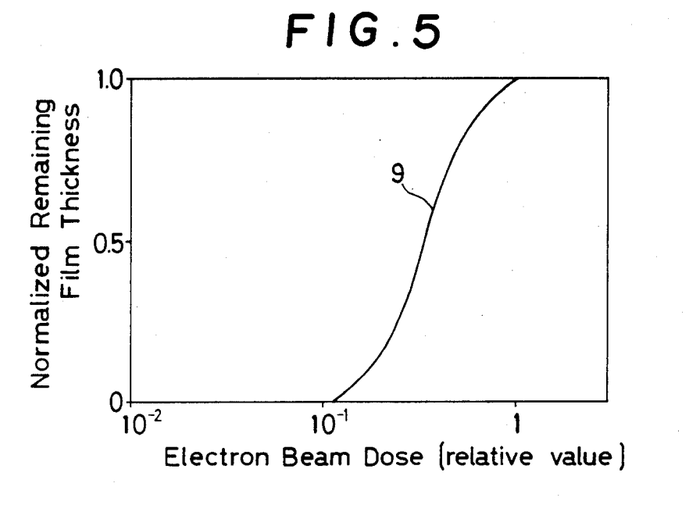

The chloromethylated copolymer A obtained in the above Example 5 was coated to a thickness of 0.1 $\mu$m on a silicon wafer. The resist layer was irradiated with an electron beam and was developed by monochlorobenzene to obtain a sensitivity curve. Curve 9 in FIG. 5 corresponds to this curve, wherein the relative value of the electron beam dose is plotted along the axis of abscissa. The contrast of the obtained resist was 2.1.

EXAMPLE 7

Figure 6:
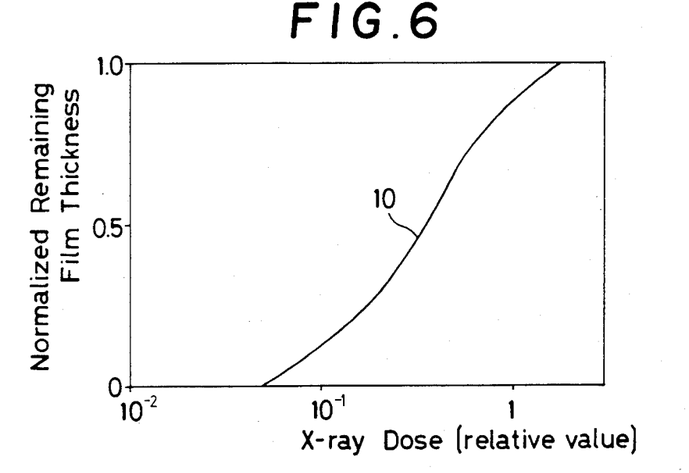

The chloromethylated copolymer A obtained in Example 5 above was applied on a silicon wafer in a similar manner to that in Example 6. The obtained resist layer was irradiated with X-rays having a wavelength of 0.15 nm using a D-3F type X-ray diffractiometry apparatus and was developed by monochlorobenzene. The sensitivity curve of the resist is shown as curve 10 in FIG. 6, wherein the relative value of the X-ray dose is plotted along the axis of abscissa. The resist had a contrast of 1.0.

EXAMPLE 8

Benzoyl peroxide was added in the amount of 0.01 g as a polymerization initiator to 0.3 g of 2-isopropenylnaphthalene and 0.7 g of chloromethylstyrene. After nitrogen substitution, block polymerization was performed at 70° C. for 70 hours. After the polymerization was completed, the polymer was dissolved in benzene, precipitated in methanol, and vacuum-dried to provide a 2-isopropenylnaphthalene copolymer into which chloromethyl groups were introduced. The composition ratio of the copolymer was such that the copolymer consisted of 28% moles of 2-isopropenylnaphthalene and 72% moles of chloromethylstyrene. Thus, the average substitution degree of chloromethyl groups was 0.72. The Tg of the copolymer was measured by a differential scanning-type calorimeter to be 122° C.

Figure 7:
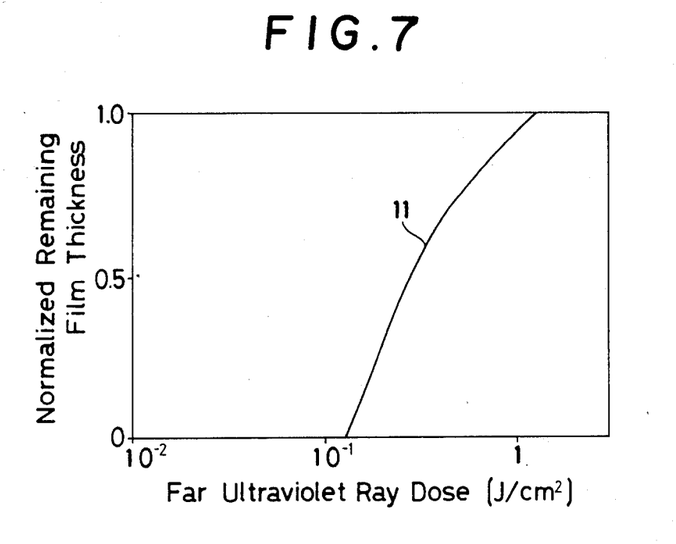

The copolymer was dissolved in monochlorobenzene to a concentration of 0.02 g/ml to prepare a coating solution. Subsequently, the coating solution was coated on a glass substrate using a spinner to form a resist layer of about 0.1 μm thickness. After the resist layer was irradiated with far ultraviolet rays having a wavelength of 254 nm, it was developed by monochlorobenzene. The sensitivity curve of the obtained resist is curve 11 in FIG. 7. The sensitivity obtained from this sensitivity curve was $2.9 \times 10^{-3}$ (J/cm$^2$) and the contrast was 1.2. The resist layer was printed in a test pattern in a similar method to that in Example 4 and the negative pattern having a line width of 0.5 μm and an excellent resolution was obtained.

What is claimed is:

1. A photoresist material comprising:
   a polymer having chloromethyl groups attached thereto and containing 2-isopropenylnaphthalene as at least one polymerized component thereof, the average substitution degree of said chloromethyl groups based on said polymer being within the range of 0.2 to 5, the polymer containing polymerized 2-isopropenylnaphthalene in an amount of at least 10 mole %.

2. The photoresist material claimed in claim 1, wherein said polymer has a polymerization degree of not less than 40.

3. The photoresist material claimed in claim 1, wherein said polymer has polymerization degree ranging from 40 to 15,000.

4. The photoresist material claimed in claim 1, wherein said polymer is a chloromethylated homopolymer of 2-isopropenylnaphthalene.

5. The photoresist material claimed in claim 1, wherein said polymer is a chloromethylated copolymer containing 2-isopropenylnaphthalene as one component of the copolymer.

6. The photoresist material claimed in claim 1, wherein said copolymer contains 2-isopropenylnaphthalene in a mole ratio of from 10 to 90%.

7. The photoresist material claimed in claim 1, wherein said polymer is obtained by chloromethylating poly-2-isopropenylnaphtharene or a copolymer containing 2-isopropenylnaphthalene with chloromethyl methyl ether.

8. The photoresist material claimed in claim 1, wherein said polymer is obtained by copolymerising components consisting of 2-isopropenylnaphthalene and at least one other component, at least part of said other components having chloromethyl groups.

9. The photoresist material claimed in claim 5 or 8, wherein the other component of said copolymer is styrene, γ-methylstyrene, chloromethylated styrene, methyl methacrylate, glycidyl methacrylate or acrylonitrile, or a mixture thereof.

10. The photoresist material claimed in claim 5 or 8, wherein the other component of said copolymer is methyl methacrylate.

11. The photoresist material claimed in claim 5 or 8, wherein the other component of said copolymer is styrene.

12. The photoresist material claimed in claim 4, wherein said homopolymer has a glass transition point ranging from 230° to 240° C.

13. The photoresist material claimed in claim 11, wherein said copolymer has a glass transition point ranging from 105° to 230° C.

14. A radiation sensitive material comprising a polymer defined in anyone of claims 1 to 13.

* * * * *